United States Patent [19]

Hata et al.

[11] Patent Number: 4,812,148

[45] Date of Patent: Mar. 14, 1989

[54] ARRANGEMENT FOR CONTROLLING THE REMOVAL OF MOISTURE FROM A TWO-CYLINDER TYPE MOISTURE REMOVER

[75] Inventors: Yasuhisa Hata, Akashi; Masaaki Kitaue, Kobe, both of Japan

[73] Assignee: Nippon Air Brake Co., Ltd., Kobe, Japan

[21] Appl. No.: 121,433

[22] Filed: Nov. 17, 1987

[30] Foreign Application Priority Data

Nov. 21, 1986 [JP] Japan ............................ 61-278993

[51] Int. Cl.$^4$ ............................................ B01D 53/04
[52] U.S. Cl. ...................................... 55/162; 55/163; 55/179; 55/267; 55/387; 55/DIG. 17
[58] Field of Search ................... 55/18, 20, 21, 81, 33, 55/62, 74, 160–163, 179, 180, 387, DIG. 17

[56] References Cited

U.S. PATENT DOCUMENTS

| | | | |
|---|---|---|---|
| 3,659,399 | 5/1972 | Kauer, Jr. et al. | 55/33 |
| 3,902,875 | 9/1975 | Bridigum et al. | 55/162 |
| 3,923,479 | 12/1975 | Glass et al. | 55/163 |
| 3,937,622 | 2/1976 | Hewitt et al. | 55/163 |
| 4,007,021 | 2/1977 | Gyllinder | 55/33 |
| 4,306,889 | 12/1981 | Krüger et al. | 55/179 X |
| 4,322,228 | 3/1982 | Myers et al. | 55/179 X |
| 4,331,457 | 5/1982 | Mörner | 55/163 |
| 4,349,357 | 9/1982 | Russell | 55/163 X |
| 4,685,941 | 8/1987 | Sato | 55/163 |
| 4,714,483 | 12/1987 | Koening et al. | 55/163 |
| 4,721,515 | 1/1988 | Hata et al. | 55/162 |
| 4,732,587 | 3/1988 | Koch | 55/163 X |
| 4,765,806 | 8/1988 | Doto | 55/33 X |

FOREIGN PATENT DOCUMENTS

| | | | |
|---|---|---|---|
| 2915336 | 10/1980 | Fed. Rep. of Germany | 55/163 |
| 53-34664 | 9/1978 | Japan . | |
| 55-23621 | 6/1980 | Japan . | |
| 59-86231 | 6/1984 | Japan . | |
| 785090 | 12/1980 | U.S.S.R. | 55/163 |
| 1148637 | 4/1985 | U.S.S.R. | 55/163 |

Primary Examiner—Robert Spitzer
Attorney, Agent, or Firm—J. B. Sotak

[57] ABSTRACT

A system for removing moisture from compressed air in pneumatic brake equipment including an air compressor having an outlet pneumatically connected to an inlet of a cooler. The cooler having an outlet pneumatically connected to a pair of electromagnetic multi-way valves. Each of the valves includes a supply section and an exhaust section. A pair of drying cylinders have inlets selectively pneumatically connectable to the supply and exhaust sections of the respective pair of electromagnetic multi-way valves. An air reservoir has its inlet pneumatically connected to the outlets of the drying cylinders via a respective check valve. A governor is pneumatically connected to the air reservoir for sensing the pressure level in the air reservoir. A control circuit is electrically connected to the pair of electromagnetic multi-way valves and the governor for causing the drying cylinders to switch to the drying and regenerating state at a preset time only when the air compressor is continuously operating for a time longer than the preset time and to remain in the same positions that they were in just prior to the stopping of the air compressor.

2 Claims, 2 Drawing Sheets

ARRANGEMENT FOR CONTROLLING THE REMOVAL OF MOISTURE FROM A TWO-CYLINDER TYPE MOISTURE REMOVER

FIELD OF THE INVENTION

This invention relates to an arrangement for controlling the removal of moisture from a dual-cylinder drying apparatus of a compressed air supply system for air brake equipment carried by railway vehicles.

BACKGROUND OF THE INVENTION

Several examples of air drying arrangements are shown and disclosed in Japanese Utility Model Registration No. 55-23621, in Japanese Utility Model Registration No. 59-86231, and in Japanese Pat. No. 53-34664, as well as in our U.S. patent applicaton Ser. No. 932,121, filed Nov. 19, 1986, now U.S. Pat. No. 4,721,515, issued on Jan. 26, 1988, entitled "Control System of a Dual-Cylinder Type Dehumidifier". One control method of switching a pair of drying cylinders into either a drying mode or a regeneration mode is illustrated in FIG. 4 of the present application. In this first control method, a pair of electromagnetic valves, represented by characters MV1 and MV2, are switched "ON" and "OFF" at each preset time period T determined by a suitable timer (not indicated). In other words, the drying and regeneration cycles of one pair of drying cylinders, represented by the characters DR1 and DR2, are equally and alternatively repeated during the operation. The second control method of a prior art arrangement is illustrated in FIG. 5 of the present application. The time chart of FIG. 5 is taken from the Table in FIG. 3 of Japanese Pat. No. 53-34664. As shown, the operational relationship of the ON-OFF periods of the governor GO is used to sense or detect the pressure level P in the air reservoir MR. That is, the cycling, namely, the startup and shutdown of the air compressor CO is controlled by the pressure. It will be noted that both of the electromagnetic valves MV1 and MV2 are in an "ON" state when the air compressor CO stops or shuts down, so that both of the drying cylinders DR1 and DR2 switch to a regenerating phase. When the air compressor CO again switches "ON", the electromagnetic valves MV1 and MV2 are switched to opposite states so that the driers DR1 and DR2 are switched.

In the first control method, illustrated in FIG. 4, the drying and regenerating cycles of the driers DR1 and DR2 are alternately repeated. Each of the recurring periods of time T is predetermined by a timer, which is independent of the operation and shutdown of the air compressor CO. Thus, the driers may be switched while the air compressor is stopped, so that the frequency increases. Therefore, the switching mechanism, including the electromagnetic valves MV1, MV2 and their control portions, tend to wear out and the chance of failures increases proportionally which represents a disadvantage and causes problems.

In the second control method, illustrated in FIG. 5, the pressure in the air reservoir MR is raised from atmospheric air to the upper pressure regulating limit value P2 by the governor GO during time t10 in FIG. 5, when the air in the air reservoir MR is consumed while it is compressed from the lower pressure regulating limit value P1 to the upper pressure regulating limit value P2 by the governor GO. It will be seen that the pressure increase or buildup is slow during time t11. At the same time, the drying cylinder DR1 continues the same drying operation during the entire period. This causes the drying cylinder to go beyond the drying limit and the drying performance to greatly decrease, which poses another problem.

OBJECTS AND SUMMARY OF THE INVENTION

Therefore, it is an object of this invention to solve the problems of the prior art arrangement, described above, as far as the limit of the drying time of the drying cylinder is concerned. Thus, the switching of the drying and regeneration cycles of the drying cylinder are arranged at each preset time only when the air compressor is in continuous operation that is longer than the preset time. When the air compressor shuts down, it maintains the drying cylinder in the same condition that it was in just before its shutdown. After the air compressor has shut down and after the pressure in the discharge side decreases to a certain pressure and after the passage of a predetermined period of time, both the drying cylinders are put into the drying state or the regeneration state. When the air compressor goes into operation, each of the drying cylinders is switched to the status opposite to that of the previous operated condition. Thus, the subject invention employs a method to control a two-cylinder type moisture recover in which the moisture in the air compressor is fed from the inlet to the outlet direction of one drying cylinder, one pair of drying cylinders containing the absorbent to be dried by the absorbent in the drying cylinder. A portion of the dried air is counterflowed from the outlet to the inlet direction of the other drying cylinder to regenerate the absorbent in the drying cylinder. The drying and regeneration cycles are alternatively repeated.

BRIEF DESCRIPTION OF THE DRAWINGS

The subject invention will be explained below on the basis of several embodiments which are illustrated in the drawings, wherein.

DETAILED DESCRIPTON OF THE INVENTION

Figure 3:
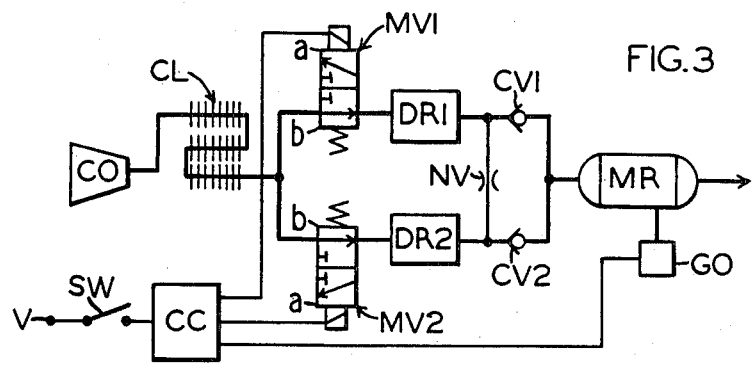
FIG. 3 shows a schematic view of a typical two-cylinder moisture removing system, which may be employed in practicing the first and second embodiments as illustrated in FIGS. 1 and 2.
Figure 4:
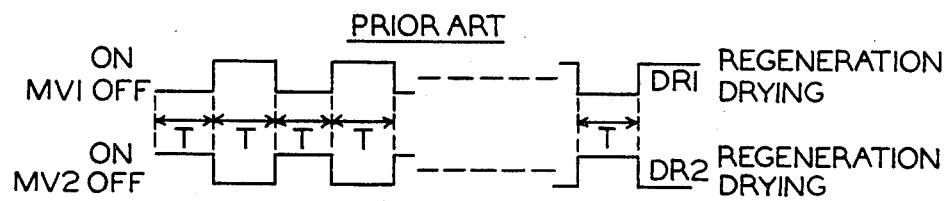
FIGS. 4 and 5 show a graphical illustration of the operating curves of two prior art moisture-removing systems.
Figure 5:
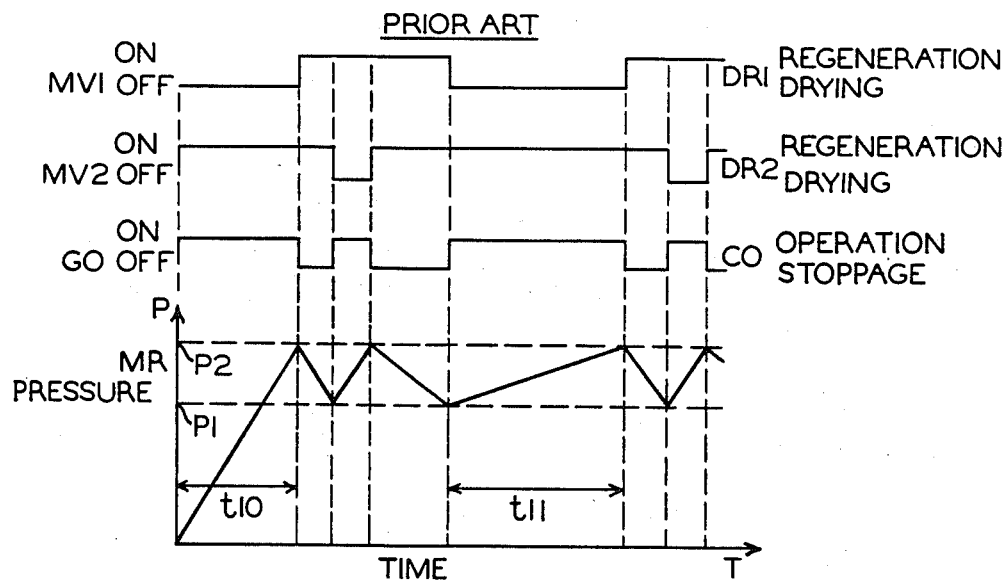

Referring now to the drawings, and in particular to FIG. 3, there is shown a typical two-cylinder type moisture removal system which includes an air compressor CO and a cooler CL. The inlet of cooler CL is connected to the outlet of the air compressor CO, while the outlet of cooler CL is connected to a pair of electromagnetic valves MV1 and MV2. The two drying cylinders DR1 and DR2 have their inlets connected to the outlets of the spring biased electromagnetic valve MV1, MV2, respectively. The dryers DR1 and DR2 contain suitable absorbent or desiccant. A pair of check valves CV1 and CV2 are connected to the outlets of the pair of drying cylinders DR1, DR2. The check valves CV1 and CV2 prevent flow back to the outlets of the dryers DR1 and DR2. A throttle valve NV is connected to the outlets of the drying cylinders DR1 and DR2 on the upstream side of the check valves CV1 and CV2. An air reservoir MR is connected to the check valves CV1 and CV2 on the downstream side thereof. The outlet of the air reservoir MR feeds the compressed air to the air brake system, such as, the brake cylinders (not shown). A governor GO is connected to the air reservoir MR. The governor GO senses and detects the upper pressure regulating limit value P2, and the lower pressure regulating limit value P1 controls the operation of the air compressor CO to supply or stop air pressure to the air reservoir MR.

The two-position electromagnetic vavles MV1 and MV2 each have an exhaust position "a" in which the flow inlet is closed and the flow outlet is opened to the atmosphere when the respective electromagnetic valve is energized to an "ON" condition. Conversely, each electromagnetic valve has a feed position "b" in which the exhaust outlet is closed and air flows from the inlet to the outlet when the respective electromagnetic valve is deenergized to an "OFF" condition.

When the electromagnetic valve MV1 is in the "OFF" condition while the electromagnetic valve MV2 in in the "ON" condition, the moist air from the air compressor CO passes from the cooler CL to the feed position "b" of the electromagnetic valve MV1. Thus, the air is fed to the drying cylinder DR1 and is dried by the absorbent in the drying cylinder DR1. The dry air then travels to the air reservoir MR via the check valve CV1. At the same time, a portion of the dried air from the drying cylinder DR1 is counterflowed from the outlet of the drying cylinder DR2 via the throttle valve NV. This diverted portion of the dried air regenerates the absorbent in the drying cylinder DR2. This air picks up moisture and the moist air is expelled to the atmosphere through the exhaust connection, since the electromagnetic valve MV2 is "ON" and in position "a".

When the electromagnetic valve MV1 is switched "ON" and the electromagnetic valve MV2 is switched "OFF", the moist air is dried in the drying cylinder DR2 while, at the same time, the absorbent in the drying cylinder DR1 is regenerated. Now, when the pressure P in the air reservoir MR reaches the upper pressure regulating limit value P2, the governor GO shuts "OFF" the air compressor CO and, when the pressure P in the air reservoir MR decreases to the lower pressure regulating limit value P1, the governor GO turns "ON" the air compressor CO.

It will be assumed that the continuous operating time of the air compressor is less than the specified drying limit time and that the air compressor switches from "ON" to "OFF", but the drying and regeneration are not switched. Thus, it will be seen that unnecessary switching is eliminated and that the frequency of switching is decreased. In addition, when the air compressor switches from "OFF" to "ON", it is switched to the status opposite that of the final stage in the previous operation and, at the same time, when the continuous operating time passes the specified time limit, the drying and regeneration phases are switched at each specified time limit in order to prevent deterioration of the drying performance or operation. In addition, after the air compressor CO switches from "ON" to "OFF", and when the length of the shutdown exceeds the specified time limit, or when the outlet side pressure in the air compressor CO is reduced to the specified pressure, both of the two drying cylinders are switched to the drying status or the regeneration status, so that the drastic decrease of air pressure in the piping from the air compressor CO to the driers is prevented. Thus, the delay in the supply of pressure to the drying cylinder outlet side is minimized when the air compressor resumes operation.

Figure 1:
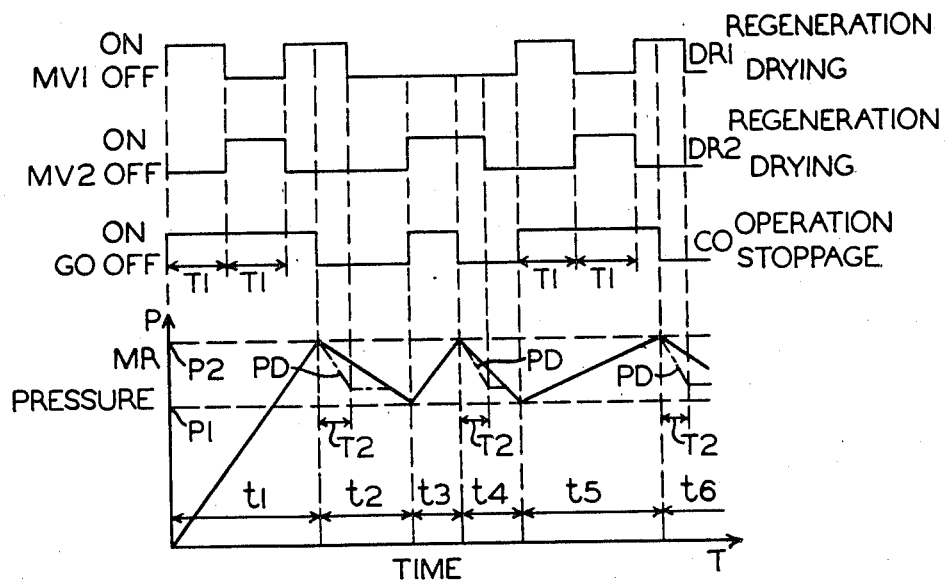
FIG. 1 is a timing chart showing a plurality of operating characteristic curves of a first embodiment of the present invention.

First, the operating curves of the first embodiment, shown in FIG. 1, will be explained in conjunction with the operation of the system illustrated in FIG. 3. Now, when the electrical power from source V is initially supplied to the electrical control circuit CC by closing switch SW, the control circuit CC turns "ON" electromagnetic valve MV1. This switches the electromagnetic valve MV1 to the exhaust position "a". However, the electromagnetic valve MV2 will remain in an "OFF" condition and will remain in its feed position "b". It will be appreciated that, at this time, the pressure P in the air reservoir MR is at atmosphere.

The electrical power is also supplied to the governor GO via control circuit CC when the switch SW is closed. The governor GO turns "ON" and detects the atmospheric pressure P in the air reservoir MR. This switches "ON" the air compressor CO so that it begins to run. The dried compressed air is conveyed to air reservoir MR via cylinder DR2, which performs the drying function. At the same time, the drying cylinder DR1 performs the regeneration function on the absorbent material contained in dryer DR1. In this state, when the preset time T1 (which is set to the optimum drying time limit of the drying cylinders DR1 and DR2) has expired, the electromagnetic valve MV1 is turned "OFF". The turning "OFF" of electromagnetic valve MV1 causes the valve to shift to the supply position "b" while the electromagnetic valve MV2 turns "ON" and moves to the exhaust position "a". The drying cylinder DR1 performs the drying operation, and the drying cylinder DR2 performs the regeneration operation. This switching of the drying and regeneration operations continues at the preset time T1 until the air compressor CO is deenergized at stops operating.

Now, when the preset drying time T1 expires and when the pressure P in the air reservoir MR reaches the upper pressure regulating limit value P2, the governor GO detects this condition and switches "OFF". The turning "OFF" of governor GO causes the air compressor CO to stop operating. However, the electromagnetic multi-way valves MV1 and MV2 maintain the same positions that they were in just before the compressor shutdown. After the air compressor CO shuts down, the compressed air retained in the piping including the cooler CL is discharged to the atmosphere by passing through the feed position "b" of the electromagnetic valve MV2, the drying cylinder DR2, the throttle valve NV, the drying cylinder DR1, and the exhaust position "a" of the electromagnetic valve MV1, so that the pressure drops as shown by the dotted line PD in FIG. 1.

However, when the specified time T2 has passed after the air compressor CO shuts down, the electromagnetic valve MV1 is cut "OFF" and shifts to the feed position "b". Under this condition, both drying cylinders DR1 and DR2 move into the drying positions, and the air pressure in the piping stops dropping. Therefore, when the air compressor CO goes back into operation, there is undue delay in feeding compressed air into the air reservoir MR. After the expiration of the preset time t2, and after the shutdown of the air compressor CO, the pressure P in the air reservoir MR decreases and approaches the lower pressure regulating limit value P1. When the pressure reaches the lower pressure regulating limit value P1, the governor GO switches "ON" and the electromagnetic valve MV2 moves to the exhaust position "a". At this time, the electromagnetic valve MV1 is still "OFF" and remains in the feed position "b", so that the drying cylinder DR1 performs the drying function and the drying cylinder DR2 performs the regeneration function. In other words, electromagnetic valve MV2 is switched to its opposite position in relation to the position it occupied during operation t1.

Since the continuous operating time t3 of the air compressor CO is less than the specified time T1, the electromagnetic valves MV1 and MV2 do not shift positions, and the drying cylinders DR1 and DR2 remain in their respective positions. After the expiration of the time t3, and when the governor GO switches "OFF", the air compressor CO stops running. However, the electromagnetic valves MV1 and MV2 do not shift their positions, and the drying cylinders DR1 and DR2 maintain their given functions. Then, when the specified time T2 has expired, the electromagnetic valve MV2 is turned "OFF" and returns to the feed position "b". Therefore, in the same manner as described above, both drying cylinders DR1 and DR2 are in their drying positions.

The operation during the passage of time periods t4, t5, and t6 is substantially the same as described above, so that no further detailed description appears to be necessary.

In the first embodiment described above, when the air compressor CO shuts down, the drying cylinders DR1 and DR2 function in the same manner as they did just before shutdown for a certain length of time T2. After the passage of this specified time T2, both drying cylinders DR1 and DR2 assume the drying positions. In other words, both electromagnetic valves MV1 and MV2 are switched "OFF", so that both electromagnetic valves MV1 and MV2 move into the feed position "b". If the electromagnetic valves MV1 and MV2 are temporarily frozen while the air compressor CO is shut down and does not operate, the electromagnetic valves MV1 and MV2 are kept in the feed position "b". Thus, when the air compressor CO resumes operation, the discharged compressed air will not leak from the exhaust outlet of the electromagnetic valves MV1 and MV2 to the atmosphere, since the valves are in feed position "a".

Figure 2:
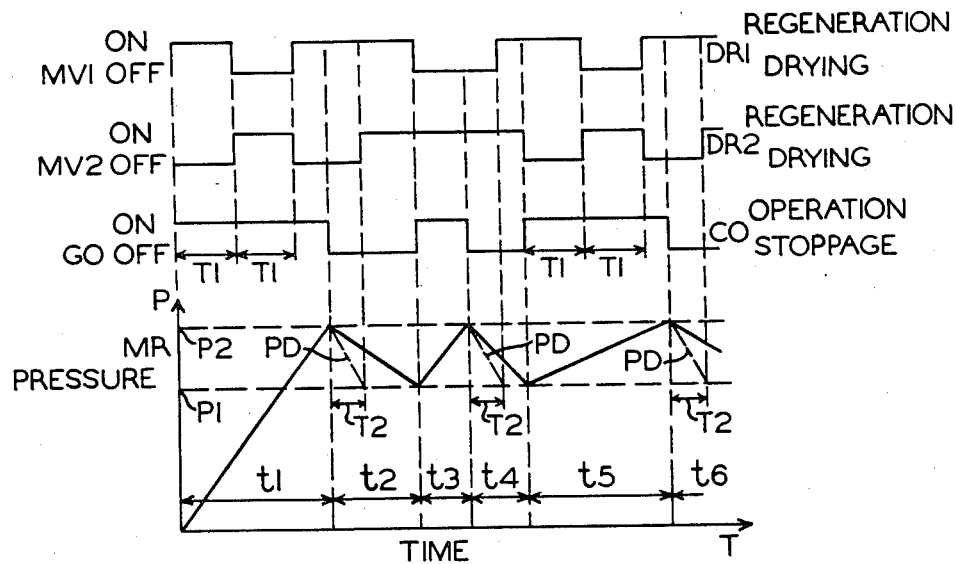
FIG. 2 is a chart showing a plurality of operating characteristic curves of a second embodiment of the present invention.

Referring now to the second embodiment, which is functionally illustrated by the curves of FIG. 2, it will be seen that when the pressure P in the air reservoir MR reaches the upper pressure regulating limit value P2, the air compressor CO stops. The air pressure in the piping, including the cooler CL, starts to decrease toward a specified pressure, namely, lower pressure regulating limit value P1. The drying cylinders DR1 and DR2 remain in the positions they occupied just before shutdown, and when the pressure reaches this specified pressure regulating limit value P1, both electromagnetic valves MV1 and MV2 are switched "ON" and are shifted to the exhaust position "a". In other words, both drying cylinders DR1 and DR2 assume the regeneration positions.

In this embodiment, a pressure sensitive switch may be suitably located in the outlet of the cooler CL for detecting the air pressure in the piping to determine a decrease to a specified pressure.

Since the other parts of this second embodiment are the same as those in the first embodiment, no additional explanation appears necessary at this point since those skilled in the art will readily understand the function and operation of the invention.

It will be seen that in the invention, as illustrated in both of the embodiments, when the air compressor CO shuts down, the system will stay in the same state that it occupied just prior to shutdown, if the continuous operating time of the air compressor CO is less than the specified drying limit time. Thus, the drying and regenerating phases are not switched. Therefore, unnecessary switching operations can be eliminated so that the switching mechanisms is not subjected to needless wear, and the problems caused by such wear can be correspondingly decreased.

In addition, when the air compressor CO begins to operate, the drying and regenerating conditions are switched to the state which is the reverse of the final state of the previous operating time. When the operating time becomes longer than the preset drying limit time, the drying and regenerating states are switched at each preset time so that a decrease in drying performance is prevented, and more efficient drying is possible without any need to increase the amount of the absorbent.

In addition, when the outlet pressure decreases to a specified pressure after the shutdown of the air compressor CO, or when a specified time has passed after the shutdown of the air compressor CO, both drying cylinders DR1 and DR2 move into either the drying condition or the regenerating condition. Thus, no further decrease in the pressure in the piping from the air compressor CO to the drying cylinder occurs, so that undue delay of the dried air supply to the outlet of the drying cylinder is minimized upon resumption of operation of the air compressor CO.

The following is a listing of the components shown in the drawings and described in the specification:
CO: air compressor
CL: cooler
MV1, MV2: electromagnetic valves (switch valves)
DR1, DR2: drying cylinders
MR: air reservoir
P1: lower pressure regulating limit value (specified pressure)
P2: upper pressure regulating limit value (specified pressure)
P: pressure in the air reservoir MR
T1: preset time
T2: specified time
V: power supply voltage
SW: switch
CC: control circuit
CV1, CV2: check valves
NV: throttle valve
GO: governor
"a": exhaust position
"b": feed position Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents, and substitutions for components of the above specifically-described embodiments of the invention may be made by those persons skilled in the art without departing from the spirit and scope of the invention as set forth in the appended claims.

We claim:

1. A system for controlling a two-cylinder type of moisture remover in which the drying time limit of the drying cylinders is preset; means for switching each of the drying cylinders to a drying and regenerating state at the preset time only when an air compressor continuously operates for a time longer than the preset time; means for maintaining each of the drying cylinders in the condition it was in just prior to the stopping of the air compressor; means for causing both of the drying cylinders to assume the drying state or the regenerating state together when the outlet pressure decreases to a certain pressure after the air compressor has stopped and when a predetermined length of time has passed after stoppage of the air compressor; means for causing the drying cylinders to be switched to a state opposite that of previous operation when the air compressor is again placed in operation; means for feeding moist air from the air compressor from the inlet to the outlet direction of the one drying cylinder to the other drying cylinder; each of the drying cylinders includes absorbent; means for causing a portion of the dried air of one drying cylinder to circulate in counterflow from the outlet to the inlet direction to regenerate the absorbent in the other drying cylinder; and means for alternately repeating the drying and regeneration states of the drying cylinders 2. A system for removing moisture from compressed air in pneumatic brake equipment comprising, an air compressor having an outlet pneumatically connected to an inlet of a cooler, said cooler having an outlet pneumatically connected to a pair of electromagnetic multi-way valves, each of which includes supply section and an exhaust section, a pair of drying cylinders having inlets selectively pneumatically connectable to said supply and exhaust sections of the respective pair of electromagnetic multi-way valves; an air reservoir having its inlet pneumatically connected to the outlets of said drying cylinders via a respective check valve; a governor pneumatically connected to said air reservoir for sensing the pressure level in said air reservoir; and a control circuit electrically connected to said pair of electromagnetic multi-way valves and said governor for causing the drying cylinders to switch to the drying and regenerating state at a preset time only when the air compressor is continuously operating for a time longer than the preset time and to remain in the same positions that they were in just prior to the stopping of the air compressor and for causing the drying cylinders to be placed in the drying state or the regenerating state together when the pressure level drops to a certain level after the air compressor has stopped and when a predetermined length of time has elapsed.

* * * * *